Jan. 21, 1958  M. HARPER  2,820,642
TRAILER FOR HANDLING AND TRANSPORTING AIRCRAFT
ENGINES AND OTHER AIRCRAFT COMPONENTS
Filed Aug. 8, 1955  5 Sheets-Sheet 1

MORRIE HARPER
INVENTOR.

BY
Paul A. Weilein
ATTORNEY.

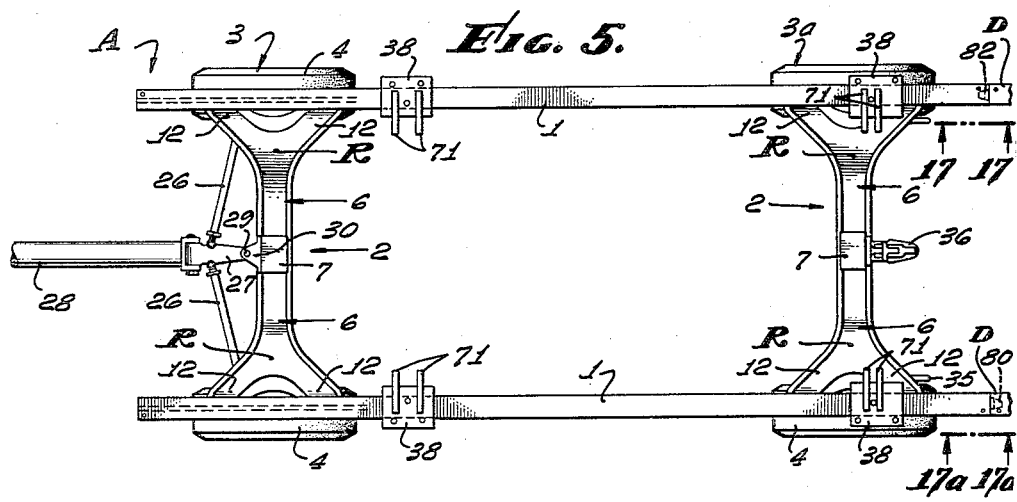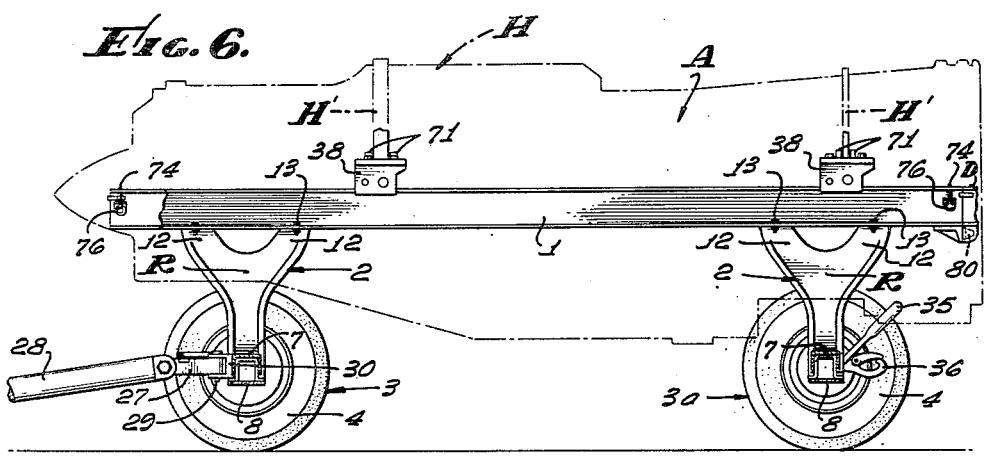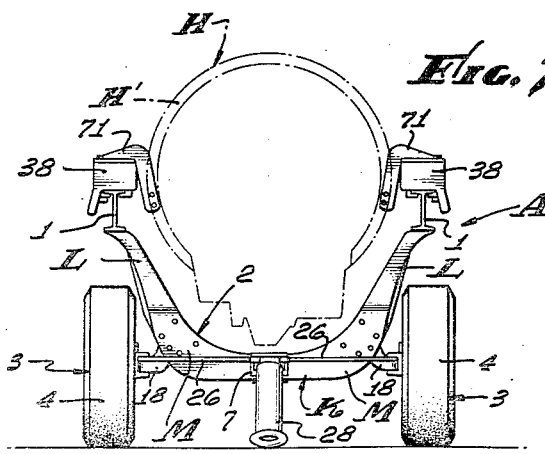

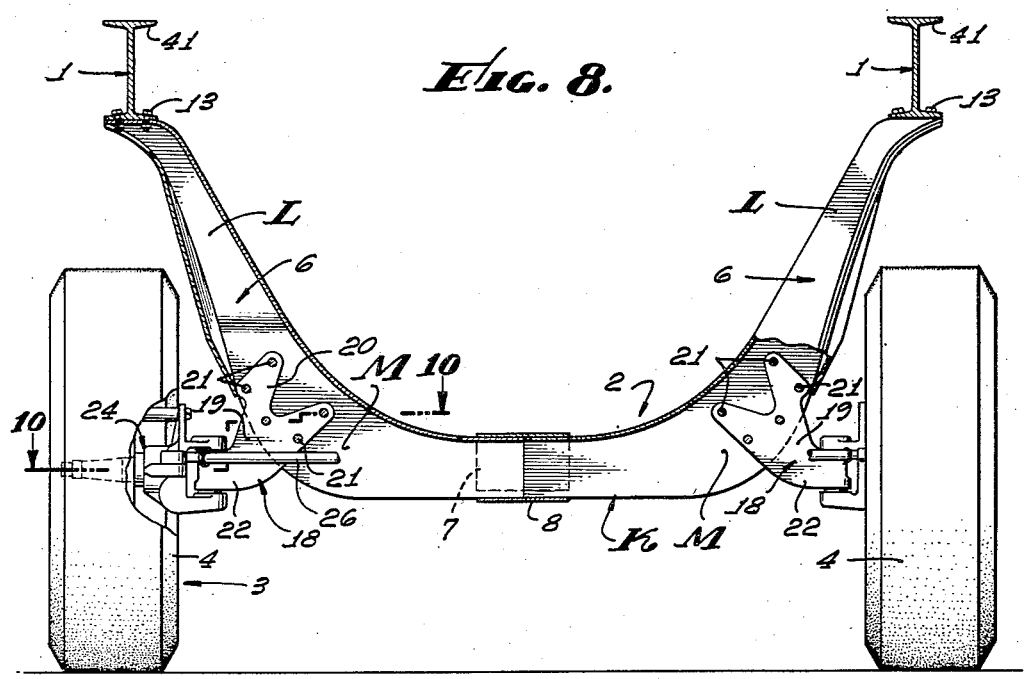
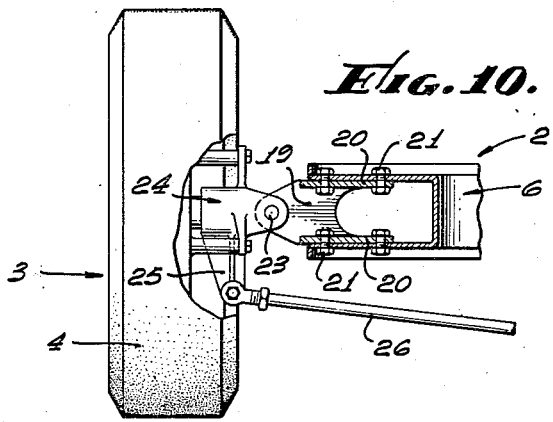
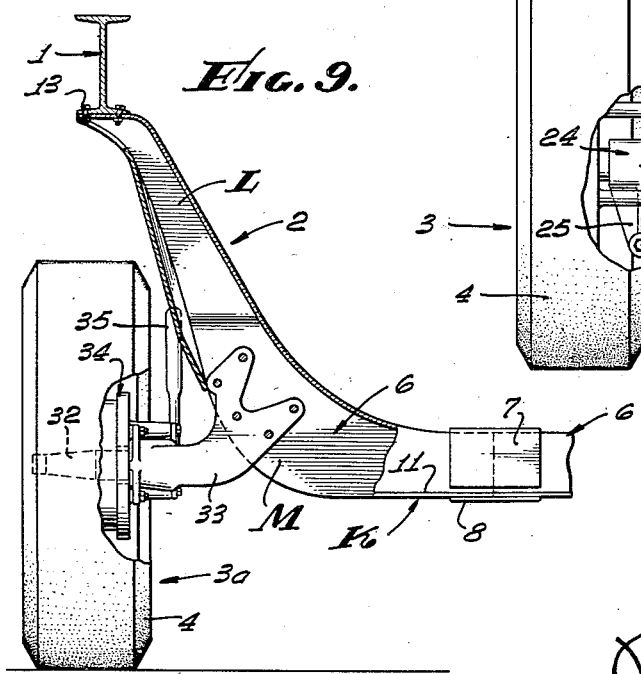

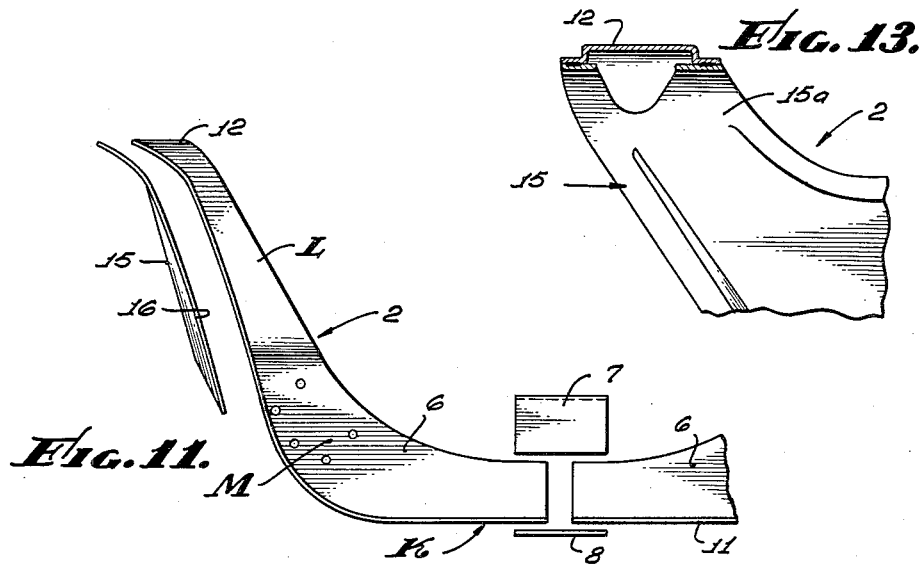
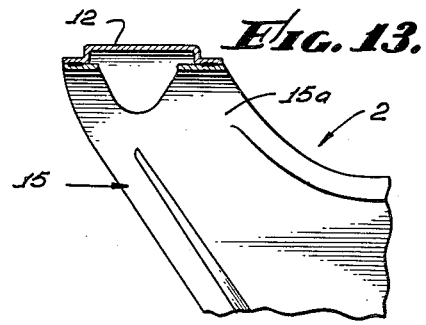
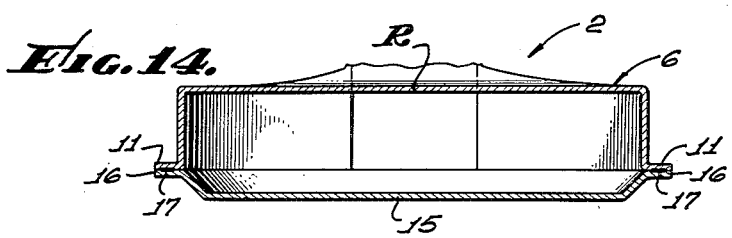
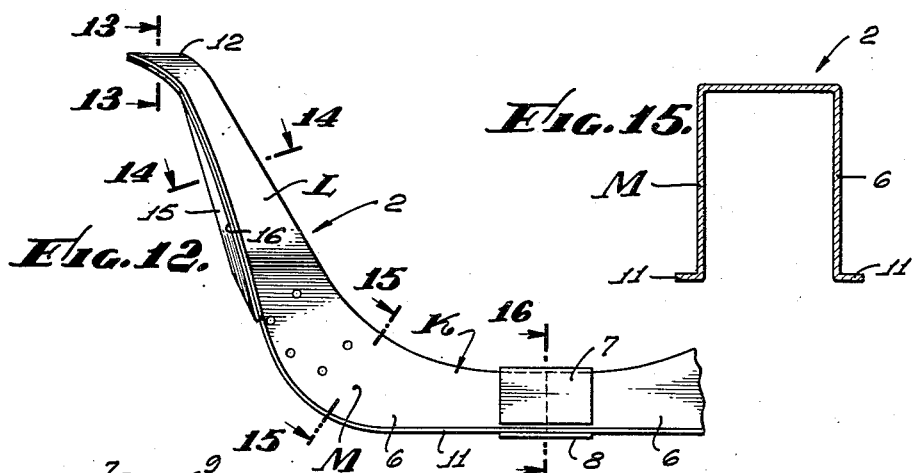
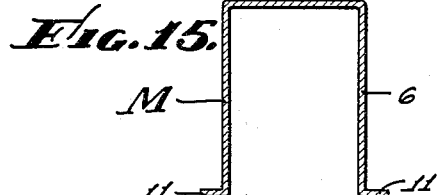
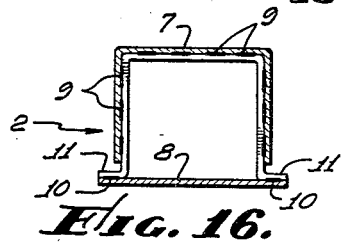

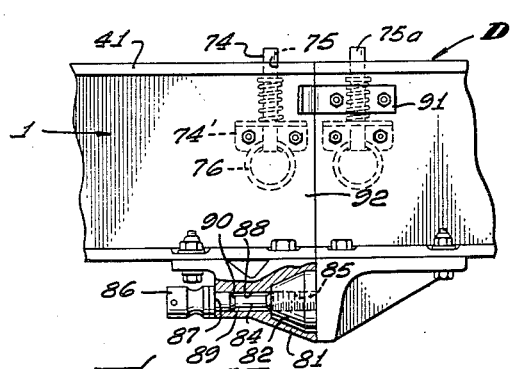
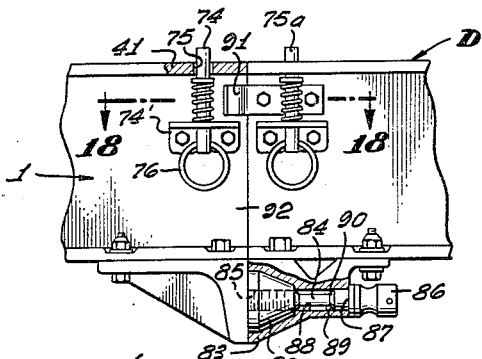
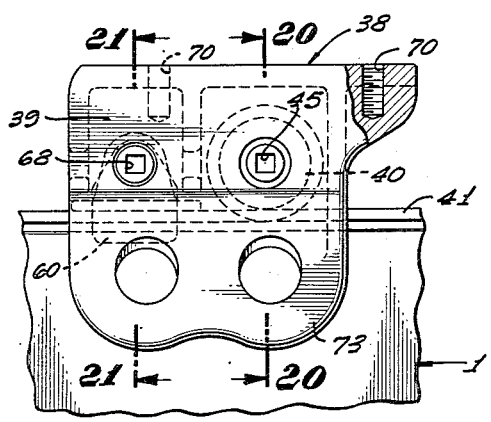
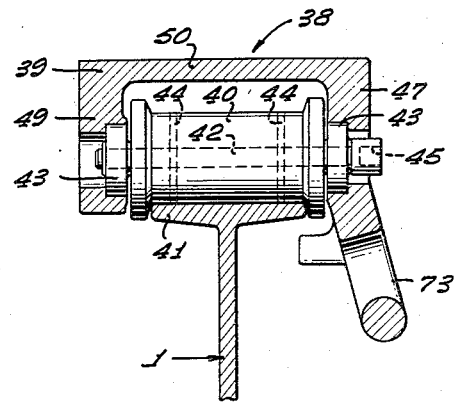
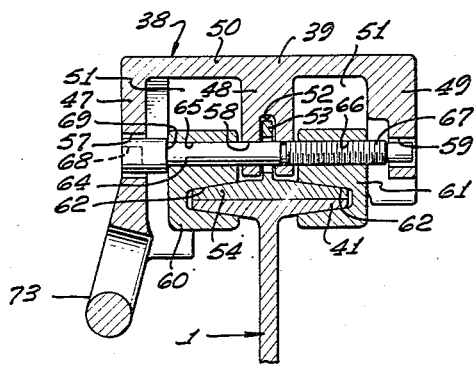
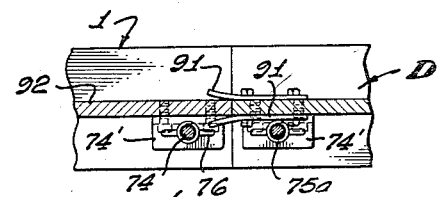

United States Patent Office 2,820,642
Patented Jan. 21, 1958

2,820,642

TRAILER FOR HANDLING AND TRANSPORTING AIRCRAFT ENGINES AND OTHER AIRCRAFT COMPONENTS

Morrie Harper, San Gabriel, Calif., assignor, by mesne assignments, to Northrop Aircraft, Inc., Hawthorne, Calif., a corporation of California Application August 8, 1955, Serial No. 527,099

8 Claims. (Cl. 280—29)

This invention relates to apparatus for facilitating the handling of aircraft engines and other aircraft components, for example jet engines, after burners, rocket pods, fuel-loaded aft fuselage sections, nose sections and similar units.

It is known that wheel-supported apparatus, referred to in this art as a positioning trailer, has been developed and used in place of cranes and hoists, in the operation of installing and removing aircraft engines and other components such as above noted. This positioning trailer includes a vehicle frame mounting a pair of load-supporting rails and means operable for vertically adjusting the rails. With this arrangement, the rails are adjusted so that an engine or other aircraft component supported thereon may be positioned for ready installation in an aircraft. Likewise, the rails readily may be adjusted to a position for receiving and supporting the engine or other component which is to be removed from an aircraft. This positioning trailer is also constructed so that the engine or other component readily may be moved endwise onto or from the rails to facilitate installation thereof in an aircraft as well as removal thereof from the aircraft.

It is an object of this invention to provide a novel mobile unit in the form of a truck or trailer, whereby aircraft engines and other aircraft components may be handled, installed, removed, transported, and stored with greater facility, efficiency and economy than heretofore.

It is another object of this invention to provide a handling and transporting trailer such as described, which is constructed and arranged so that an aircraft engine or other aircraft component readily may be transferred therefrom to the positioning trailer, or as readily transferred from the positioning trailer to the transporting trailer, in both instances, without requiring the use of a hoist or crane.

It is another object of this invention to provide a handling and transporting trailer, such as described, which is constructed and arranged so that it may be used instead of a shipping crate for transporting an aircraft engine or other aircraft unit.

It is another object hereof to provide a transportation trailer such as described, which is of such low weight and small bulk as to make it practicable to transport it by aircraft with an aircraft engine or other aircraft component supported thereon.

Another important object of this invention is the provision of a trailer such as described, which is constructed in a novel manner to provide adequate strength with a low weight and to withstand the stresses of compressive loading, as well as shocks, jars and impacts, in a highly efficient manner.

A further object is the provision of a transportation trailer such as described, which provides requisite flexibility to withstand the stresses of shock, impacts and loading without the use of spring suspension and shock absorbers, thereby reducing the bulk and weight of the trailer as well as the cost thereof.

An additional object of this invention is the provision of a transportation trailer such as described which is of a simple skeleton construction, embodying essentially a pair of horizontal load-supporting rails arranged in laterally spaced relation and mounted on the upper ends of a pair of cross beams in the form of inverted arches, the beams being supported on wheels and fabricated to provide for effective absorption of shocks, loads and stresses.

Another object of this invention is to provide a trailer such as described, having novel means for detachably joining ends of the load-supporting rails thereof with complementary joining means on ends of the rails of a positioning trailer such as hereinbefore described, whereby the two trailers are connected so that the load may be transferred from one trailer to the other.

Another object hereof is the provision of a transportation trailer such as described, in which novel carriage members are operable alike on the rails of the positioning trailer and the transportation trailer to provide for a convenient rolling of the load from one trailer to the other.

An additional object of this invention is to provide a transportation trailer such as described, in which a plurality of carriage members movable on the rails of the trailer are provided with means for releasably securing an engine or other component of an aircraft to the carriage members, as well as with means for releasably holding the carriage members against movement on the rails.

It is another object of this invention to provide a trailer such as described, in which novel means are provided for tying the trailer and its load to a floor or other support, as in an aircraft, or when using the trailer as a stand for testing an engine.

A further object is to provide a trailer such as described, which readily may be towed or otherwise easily moved from place to place in and out of hangers and buildings and on aircraft fields in view of its light weight and small bulk.

An additional object of this invention is the provision of carriage members such as described, which include novel drive means operable for propelling the loaded carriage members along the rails of the positioning trailer or the rails of the transportation trailer.

This invention possesses many other advantages and has other objects which may be made more easily apparent from a consideration of one embodiment of the invention. For this purpose there is shown a form in the drawings accompanying and forming part of the present specification. This form will now be described in detail, illustrating the general principles of the invention; but it is to be understood that this detailed description is not to be taken in a limiting sense, since the scope of the invention is best defined by the appended claims.

Referring to the drawings:

Fig. 5 is a top plan view of the transportation trailer shown in Fig. 1;

Fig. 6 is a side elevation of the transportation trailer, showing in dashed lines the outline of a jet engine as it would appear when supported by the trailer;

Fig. 7 is an end elevation of the transportation trailer, showing in dashed lines a jet engine supported thereon;

Fig. 8 is an elevational view of the end of the trailer shown in Fig. 7, on an enlarged scale, with parts broken away and parts shown in section, for clarity of illustration;

Fig. 9 is a fragmentary elevational view, partly in section, of a portion of the end of the trailer opposite that shown in Fig. 8;

Fig. 10 is a fragmentary sectional view, taken substantially on the line 10—10 of Fig. 8;

Fig. 11 is a fragmentary exploded view of a portion of one of the inverted arch cross beams;

Fig. 12 is an elevational view of the parts of the cross beam shown in Fig. 12, as they would appear when assembled;

Fig. 13 is a sectional view, on an enlarged scale, taken on the line 13—13 of Fig. 12;

Fig. 14 is a sectional view, on an enlarged scale, taken on the line 14—14 of Fig. 12;

Fig. 15 is a sectional view, on an enlarged scale, taken on the line 15—15 of Fig. 12;

Fig. 16 is a sectional view, on an enlarged scale, taken on the line 16—16 of Fig. 12;

Fig. 17 is a side elevational view, partly in section, looking in the direction of the arrows 17—17 of Fig. 5, showing how one of the rails of the positioning trailer and one of the rails of the transportation trailer are releasably locked in alignment in the use of the two trailers to transfer a load from one to the other;

Fig. 17a is a view corresponding to Fig. 17, looking in the direction of the arrows 17a—17a in Fig. 5, showing how the other rails of the two trailers are releasably locked when the two trailers are used conjunctively to transfer a load from one to the other;

Fig. 18 is a sectional view taken on the line 18—18 of Fig. 17a;

Fig. 19 is a fragmentary side elevation of a portion of one of the rails of the transportation trailer and one of the carriage members mounted on the rails, part of the carriage member being broken away and shown in section;

Fig. 20 is a sectional view taken on the line 20—20 of Fig. 19; and

Fig. 21 is a sectional view taken on the line 21—21 of Fig. 19.

Figure 2:
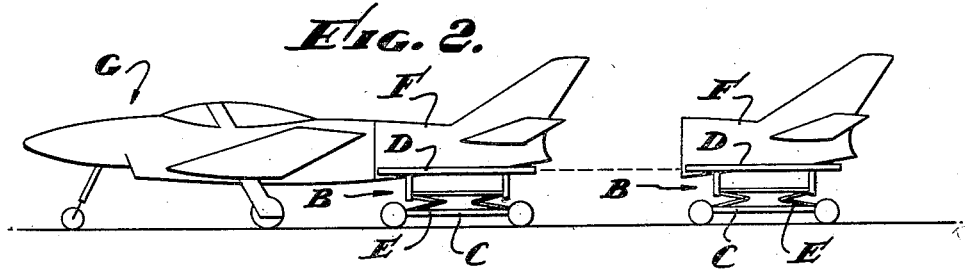
Fig. 2 is a schematic view showing how a positioning trailer, which is not a part of the present invention, may be operated to install or remove a tail section of an airplane.
Figure 3:
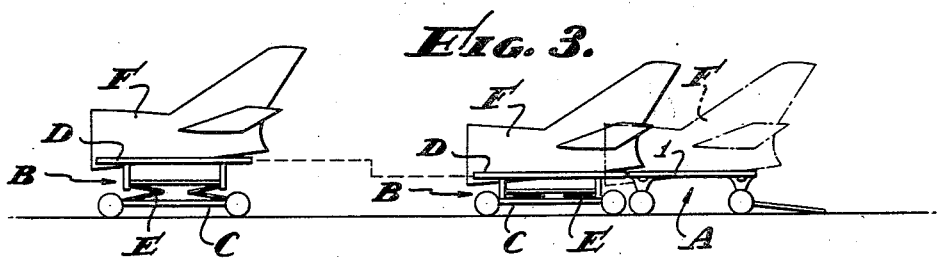
Fig. 3 is a schematic view showing how the transportation trailer may be used in conjunction with the positioning trailer to transfer a tail section to the positioning trailer or to receive the tail section from the positioning trailer.
Figure 4:
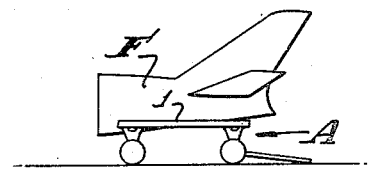
Fig. 4 is a side elevation of the transportation trailer as it would appear with a tail section of an airplane supported thereon.

The present invention provides a simply constructed, light-weight trailer A which will facilitate the handling and transportation, also the storage and other handling of aircraft engines and other aircraft parts such as hereinbefore noted. One use of the trailer A is shown in Figs. 2, 3 and 4, where, in cooperation with a positioning trailer B, it is operable to install or remove a section of an airplane. The positioning trailer generally includes a wheel-supported body C mounting a pair of rails D and means E operable for adjusting the rails D. The rails D provide for support of an engine or other aircraft component in the operation of installing and removing the engine or other component. The adjusting means D provides for raising and lowering the rails best to position them in installing and removing aircraft components. The use of this positioning trailer eliminates cranes and hoists usually employed in installing and removing aircraft engines and sections.

A typical use of a positioning trailer B and a transportation trailer A is shown in Figs. 2, 3 and 4. Fig. 2 shows how a positioning trailer is moved to a position beneath a tail section F of an airplane G and adjusted to remove this tail section from the airplane. Fig. 3 shows how the rails of the positioning trailer B with the tail section F thereon have been lowered and releasably joined to the rails of a transportation trailer A so that the tail section may be shifted from the rails of the positioning trailer onto the rails of the transportation trailer. Fig. 4 shows the transportation trailer A as it would appear with the tail section F thereon after the trailer A is disconnected from the trailer B. Figs. 2, 3 and 4, considered in the reverse order, show how the two trailers may be used to install a tail section on an airplane. In these uses of the trailers, it is unnecessary to employ a hoist or a crane.

It is apparent from this showing of a typical use of the two trailers for handling a section of the fuselage of an airplane, that the same procedure may be followed in installing and removing an aircraft engine. The trailer A is of such construction that it may be used to advantage for supporting an aircraft engine or other sub-assembly of an aircraft in place of a shipping crate, for transporting the engine or sub-assembly by airplane or any other means of transportation. It also may be used as a storage stand for such aircraft components or as a test stand on which an engine may be operated.

Referring more specifically to the form of this invention illustrated in the accompanying drawings, it is seen that this form provides a trailer comprising a pair of load-supporting rails 1 supported in a horizontal position on a pair of cross beams 2 mounted on front and rear wheels 3 and 3a. The rails 1 may be in the form of I-beams, preferably made of aluminum to reduce weight. The cross beams 2 are in the form of inverted arches, preferably fabricated of sheet steel in a particular construction for the purposes which will be hereinafter fully described. The wheels 3 and 3a have pneumatic tires 4 thereon and the axes of the wheels are adjacent the crowns of the beams 2, there being a pair of wheels supporting each beam.

It is desired that the rails 1 and beams 2 be arranged to provide a load-supporting skeleton frame open at both ends with considerable loading space between and below the rails. For this purpose the beams 2 have considerable depth and are disposed adjacent the ends of the rails in somewhat inwardly spaced relation to the rail ends. With this arrangement an aircraft engine, for example, a jet engine H such as indicated in dotted lines in Figs. 6 and 7, may be supported on and between the rails with the lower side thereof disposed close to but in spaced relation to the beams 2, whereby the engine may be moved endwise onto and off the rails. Other aircraft components, such as fuel-loaded aft fuselage sections, nose sections, rocket pods and similar units, may be supported and handled by the trailer in the same manner as the engine H.

Each inverted arch beam 2, as shown in Figs. 8-16, is especially fabricated of sheet steel to provide adequate strength with minimum weight, also to sustain and absorb load-shocks and other stresses occasioned in the various uses of the trailer. This special construction makes it unnecessary to employ spring suspension and/or shock absorbers in the trailer, thereby maintaining low weight and low cost factors.

Accordingly, each cross beam 2 includes a pair of half-arch sections 6 of channelled form joined in abutting relation at their inner ends to form an inverted arch. A channelled joint member 7 and a joint 8 are employed to join the abutting inner ends of the sections 6. The member 7 embraces these abutting ends and is welded thereto as at 9 (Fig. 16). The plate 8 extends across the open lower sides of the abutting ends of the sections 6 and is welded, as at 10, to outwardly directed flanges 11 which extend along the edges of the sections 6 throughout the length of the sections. The flanges 11 reinforce the beam sections 6 and facilitate fabrication of the beams.

Figure 1:
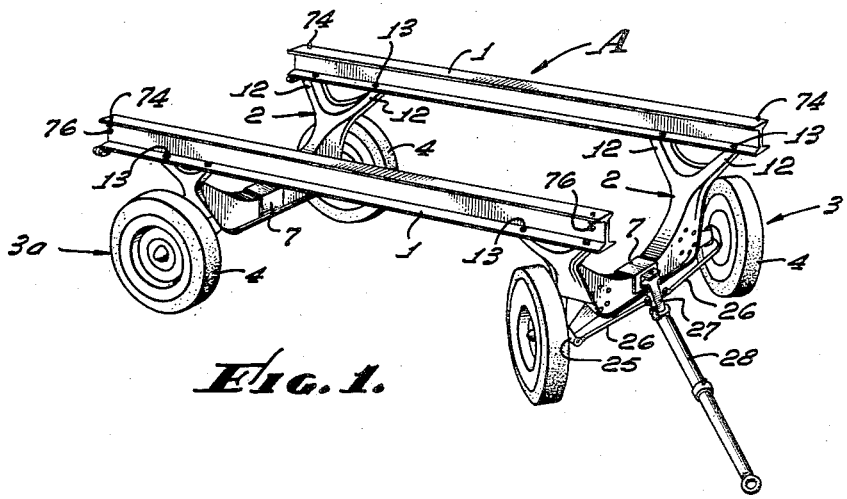
Fig. 1 is a perspective view of a transportation trailer embodying the present invention.

The beam sections 6 are shaped so that the crown K of each inverted arch beam is substantially horizontally disposed. At the junctures of the crown K with the side members or legs L of the beam, are portions M of enlarged depth. These enlarged portions have a radius such that the legs L extend divergently upwardly from the crown K. This provides a wide spread of the legs L for accommodating low-carried loads on the rails 1 without having the load rest on the legs L or crowns K. The depth of the channelled sections 6 increases from the center of the crown K toward the enlarged portions M. From the enlarged portions M, the depth of the sections 6 gradually decreases towards the upper ends of these sections. However, the upper portions of the section 6 of each beam are widened, as at R, in a direction normal to the depth of the sections and terminate in divergent end portions or arms 12 which are bolted, as at 13, to the under sides of the rails 1. Thus, as seen in Figs. 1, 5 and 6, the upper portions of the legs L of the beams are Y-shaped and in having the arms 12 secured at longitudinally spaced points on the rails 1 they provide considerable stability in the support of the rails.

Each beam 2 is provided with a pair of reinforcing plates 15 which, as shown in Figs. 11, 12 and 14, are dished and formed with marginal flanges 16 welded, as at 17, to the flanges 11 on the sections 6 of the beam. The plates 15 with the legs L of the beams, form a box construction as shown in Figs. 8, 9 and 14. The convex sides of the plates 15 are outermost and these plates extend from adjacent the enlarged portions M of the beam sections 6 to the divergent upper ends or arms 12, thereby closing the open sides of the channels in the upper portions of the legs L of the beam sections. The plates 15 conform to the Y-shape of the beam sections 6 as well as to the shape of the arms 12, it being noted that the upper ends of the plates are bifurcated, as at 15a.

The front wheels 3, as shown in Figs. 5, 6, 7, 8 and 10, are mounted to provide for steering of the trailer, with their axes in a plane passing through the crown K of the front beam 2. Figs. 8 and 10, show one way in which these front wheels may be mounted on brackets 18 bolted or otherwise fixed in the channels of the enlarged portions M of the front cross beam 2. Each of the brackets 18 has a channel shaped body 19, the sides of which are formed with divergent ears 20 secured by fastenings 21 to the sides of the portions M. An extended portion 22 of each bracket 18 projects outwardly and horizontally from each portion M and pivotally supports with the aid of a king pin 23, a spindle unit 24 for one of the front wheels. The spindle units 24 for the two front wheels 3 are provided with crank arms 25 connected by means of links 26 to a clevis 27. The clevis 27 is pivotally connected with a tongue or draw bar 28 also pivoted, as at 29, to a clevis or bracket 30 welded to the front cross beam 2 at the joint of the sections 6 of this beam. The connection of the links 26 with the clevis 27 is such that the front wheels will be turned according to the movement of the draw bar 28, thereby providing for the steering of the trailer.

It should be noted that the formation and disposition of the front cross beam with respect to the size of the front wheels 3, and the manner in which these wheels are mounted, provide for a short turning radius of the trailer.

The rear wheels 3a are mounted, as shown in Fig. 9, on spindles 32 carried by brackets 33 mounted in the channels of the enlarged portions M of the rear cross beam 2, and secured in place in the same manner as the brackets 18. The axes of the rear wheels are in a plane passing through the crown K of the rear beam 2. Each rear wheel is provided with a suitable manually operable brake unit 34 including operating means 35 by which the brake may be set and released.

The rear cross beam 2 may be provided with a hitch unit 36 fastened in any suitable manner to the crown of the beam, whereby the trailer may be towed from the rear end if desired.

Carriage members 38 are provided for supporting an aircraft engine, or other component of an aircraft, on the rails of the transportation trailer A, as well as on the rails of the positioning trailer B. Each carriage member is provided with drive means operable to propel the carriage member and the load thereon on the rails of the trailer. Also provided in each carriage member is means for releasably holding the carriage member against movement on the rails. Means is also provided on the carriage member to facilitate the lashing or tying of the transportation trailer to the deck of an aircraft or other transporting vehicle in which the trailer and its load are transported.

As shown in Figs. 5 and 6, four of the carriage members 38 are usually employed to support an engine or other aircraft component, although any number may be used as desired.

Each carriage member 38 is provided with means adapted to be releasably secured by suitable fastenings to portions H' of an engine. This securing means will of course be constructed to suit different makes and types of engines as well as to suit different fuselage sections or other components which are to be handled with the transportation trailer.

Each of the carriage members 38, as shown in Figs. 19, 20 and 21, comprises a body 39 supported on a flanged roller 40 which rides on the upper flange 41 of the rails 1 of the tractor. The roller 40 is mounted on a shaft 42 supported in bearings 43, the roller being fixed by pins 44 to the shaft so as to turn therewith. Accordingly, the shaft 42 serves as a drive means for the roller and has a socket 45 of non-circular cross section in one end exposed on the outer side of the body 39. A suitable hand operated or power driven tool (not shown) may be applied to the socket 45 for driving the shaft and roller so as to propel the carriage member along the rail.

The body 39 of each carriage 38 is also formed to carry means for clamping the carriage member to the rails to hold the carriage member against movement thereon. Thus, as shown in Fig. 21, the body 39 at a point to one side of the roller 40, is provided with opposed and laterally spaced portions 47, 48 and 49 which depend from the top member 50 of the body. The outermost portions 47 and 49 form the sides of the entire body and the shaft 42 is supported by and between these side portions. The middle portion 48 forms with the side portions 47 and 49, a pair of downwardly opening recesses 51. A slot 52 is formed in the middle portion 48 to receive an apertured ear 53 on a rail-clamping shoe 54. The ear 53 is engaged in the slot 52 so that its aperture is in registration with openings 57, 58 and 59 in the portions 47, 48 and 49 respectively. Clamping jaws 60 and 61 having wedge-shaped slots 62 are arranged to embrace the edges of the upper flange 41 of the rail 1, and are disposed in the recesses 51. These slots 62 in the jaws 60 and 61 receive the shoe 54 as well as the edges of the rail flange 41. The walls of the wedge-shaped slots 62 conform to and engage the inclined surfaces of the shoe 54 and rail flange 41 so that upon forcing the jaws 60 and 61 toward one another the shoe 54 will be forced into frictional engagement with the rail flange 41. At the same time the lower walls of the slots 62 will frictionally grip the undersides of the rail flange 41, thereby securely holding the carriage member 38 against movement on the rail 1.

Means for actuating the jaws 60 and 61 is provided in the form of a screw shaft 64 which extends through the openings 57, 58 and 59 in the portions 47, 48 and 49 respectively. This shaft is also extended through the aperture in the ear 53 as well as through openings 65 and 66 in the jaws 60 and 61. The portion of the shaft 64 that is in the opening 66 in the jaw 61 is screw threaded as at 67, as is also the opening 66. One end of the screw shaft 64 is provided with a socket 68 of non-circular cross section for reception of a suitable tool or wrench, not shown, for turning the shaft. This socket is exposed in the opening 57 in the side portion 47 of the body 39. A shoulder 69 is formed by the socket 68 and engages the outer side of the jaw 60.

Thus, upon appropriate turning of the screw shaft 64, the jaws 60 and 61 may be actuated to clamp and release the associated carriage member 38.

The top member 50 of each carriage member 38 is shown in Fig. 19 is provided with screw threaded openings 70 whereby a bracket 71, as shown in Figs. 5, 6 and 7, may be bolted thereto. The brackets 71 serve as means for fastening the carriage members 38 to the engine or other component of an aircraft supported on the several carriage members 38. As here shown, each of the brackets 71 extends laterally inwardly and then downwardly from the top member 50 of each carriage member 38 and is formed so as to embrace the flange or similar part H' on an aircraft engine and be bolted thereto. It should be noted that the brackets 71 may be varied as to form to make them suitable for securing different types of engines and other aircraft components to the carriage members 38.

Each carriage member 38 is provided with means in the form of an apertured extension 73 for tying or lashing the trailer to the deck of an aircraft or other vehicle in which the trailer is transported, as well as for tying the trailer down to a floor or to the ground when this is desired. The extension 73 projects downwardly from the outer side portions 47 of the body 39 of each carriage member 38 and is of heavy construction to assure that a reliable tie down of the trailer may be effected with suitable ropes, cables or the like, not shown. In tying the carriage members 38 down to a deck or floor as herein noted, while the carriage members are immovably clamped on the rails 1, the trailer as a whole with the engine or other aircraft part thereon is reliably held against movement as may be desirable when using the trailer for shipping an aircraft engine or other part, or when storing the trailer and aircraft part.

Stop means are provided on ends of the rails 1 of the transportation trailer so as to prevent the carriage members from rolling off the ends of the rails. As shown in Figs. 17 and 17a, this stop means includes spring-loaded stop pins 74 mounted in brackets 74' on the rails 1 and extending above the top flange 41 through openings 75. Handles 76 in the form of rings are connected with the stop pins 74 and operable for moving the pins from position extending above the top flange 41 when it is desired to move the carriage members 38 from the transportation trailer onto the positioning trailer and vice versa. Similar stop pins 75a are provided as shown in Figs. 17 and 17a, on the rails D of the positioning trailer B.

As shown in Figs. 5, 6, 17 and 17a, the transportation trailer may be coupled to the rails D of the positioning trailer B for transferring an engine or other aircraft section from one trailer to another. Accordingly, the rear end of one of the rails 1 is provided with a male fastening member 80, whereas the rear end of the other rail is provided with a female fastening member 81. The ends of the rails D of the positioning trailer B are likewise provided with male and female fastening members 82 and 83 respectively, which are cooperable with the members 80 and 81 respectively. The male members 80 and 82 are bolted to the bottom flanges of the rails 1 and D respectively, and are of frustro-conical form so as to fit in similarly shaped sockets in the female members 81 and 83. The female members 81 and 83 are similarly bolted to the rails 1 and D, respectively. The female members 81 and 83 are provided with clamping screws 84 adapted to be screwed into screw threaded bores 85 in the male members 80 and 82 to releasably hold the ends of the rails 1 and D connected for moving the carriages 38 from one trailer to the other. The screws 84 are provided with socket heads 86 forming shoulders 87 which abut the inner ends of the female members 81 and 83 to limit movement of the screws in one direction in the bores 88 of the female members. Stop pins 89 in the female members are engageable with shoulders 90 on the screws 84 to limit movement of the screws in the opposite direction. The socket heads 86 provide for the turning of the screws 84 with a suitable tool or wrench not shown.

Means may be provided on ends of the rails 1 of the transportation trailer, or on the end of the rails D of the positioning trailer, for cooperation with the male and female fastening members 80, 81, 82 and 83 to hold the rails in proper alignment. As here shown, this means is on the ends of the rails D and comprises a pair of opposed guide members 91 which are positioned to embrace the webs 92 of the rails 1 as shown in Figs. 17, 17a and 18, and thereby prevent lateral misalignment of the connected rails.

I claim:

1. A trailer for handling and transporting aircraft engines and other aircraft components comprising: a pair of rails arranged in opposed parallel relation and having upper plane surfaces for supporting an aircraft engine or other aircraft component; a pair of cross beams disposed below said rails; said beams being in the form of inverted arches having their upper ends fixed to said rails adjacent the rail ends; wheels supporting said beams; each of said beams being of channelled form in cross section and having a crown portion; leg portions extending upwardly and divergently from the crown portion; each beam having portions of increased channel depth at the junctures of said crown portion with said leg portions; the depth of the channels in said leg portion decreasing toward the upper ends of the leg portions; said leg portions increasing in width toward their upper ends; said upper ends being divided to form a pair of arms secured at longitudinally spaced points on said rails to position the upper plane surfaces in a common horizontal plane to provide two horizontal tracks.

2. A trailer for handling and transporting aircraft engines and other aircraft components comprising: a pair of rails arranged in opposed relation for supporting an aircraft engine or other aircraft component; a pair of cross beams disposed below said rails; said beams being in the form of inverted arches having their upper ends fixed to said rails adjacent the rail ends; wheels supporting said beams; each of said beams being of channelled form in cross section and having a crown portion; leg portions extending upwardly and divergently from the crown portion; each beam having portions of increased channel depth at the junctures of said crown portion with said leg portions; the depth of the channels in said leg portion decreasing toward the upper ends of the leg portions; said leg portions increasing in width toward their upper ends; said upper ends being divided to form a pair of arms secured at points longitudinally spaced on said rails; and reinforcing plates fixed to the open sides of said leg portions and conforming to said leg portions and said arms.

3. A trailer for handling and transporting aircraft engines and other aircraft components comprising: a pair of rails arranged in opposed parallel relation for supporting an aircraft engine or other aircraft component; a pair of cross beams disposed below said rails; said beams being in the form of inverted arches having their upper ends fixed to the lowermost portions of said rails adjacent the rail ends; wheels supporting said beams; each of said beams being of channelled form in cross section and having a crown portion and leg portions extending upwardly and divergently from the crown portion; each beam having portions of increased channel depth at the junctures of said crown portion with said leg portions; and means mounted in the channels of said portions of increased depth for supporting said wheels.

4. A trailer of rectangular configuration in plan having fore and aft ends, comprising: a pair of rails arranged in opposed parallel relation; a pair of arched cross beams of channel construction attached to said rails in an inverted attitude to provide inverted arches extending between said rails adjacent end portions of the latter; a plurality of wheel assemblies attached to said cross beams for supporting said beams and rails; each of said cross beams having a crown portion located midway between said rails and leg portions extending upwardly and divergently from the crown portion; each of said beams having portions of greatest channel depth adjacent the junctures of said crown and leg portions; the depth of the channels in said leg portions decreasing toward the upper ends of said leg portions; and the upper ends of said leg portions being bifurcated.

5. A trailer as set forth in claim 4 further characterized in that each of said cross beams, in their assembled position on said rails, have fore and aft webs facing fore and aft of said trailer respectively and inner and outer sides and in which the latter sides constitutes the open sides of said cross beams.

6. A trailer as set forth in claim 5 further characterized in that each of the bifurcated upper end portions of said leg portions are longitudinally spaced along said rails.

7. A trailer as set forth in claim 6 further characterized in that said pair of rails in their assembled positions each define an uppermost normally horizontal plane surface adapted to receive roller type mountings on which structure to be transported may be mounted and moved longitudinally therealong.

8. A trailer of the type set forth in claim 5 further characterized in that said plurality of wheel assemblies constitutes four individual assemblies each including a wheel, axle, and mounting fixture and in which the latter is mounted between said fore and aft webs, adjacent the juncture of said crown and leg portions of said cross beams, and which terminate outwardly of said inner face.

References Cited in the file of this patent
UNITED STATES PATENTS

| | | |
|---|---|---|
| 864,680 | Neville et al. | Aug. 27, 1907 |
| 1,835,133 | Bergen | Dec. 8, 1931 |
| 1,942,022 | Faries | Jan. 2, 1934 |
| 2,045,566 | Berg | June 30, 1936 |
| 2,127,972 | Hutchinson et al. | Aug. 23, 1938 |
| 2,567,164 | Brehany | Sept. 11, 1951 |
| 2,712,874 | Murray | July 12, 1955 |
| 2,724,597 | Fowler | Nov. 22, 1955 |
| 2,733,933 | Kishline | Feb. 7, 1956 |